Oct. 22, 1929.  J. WATTMANN  1,732,390
WELDING COLLAR FOR RAIL JOINTS
Filed Dec. 10, 1928
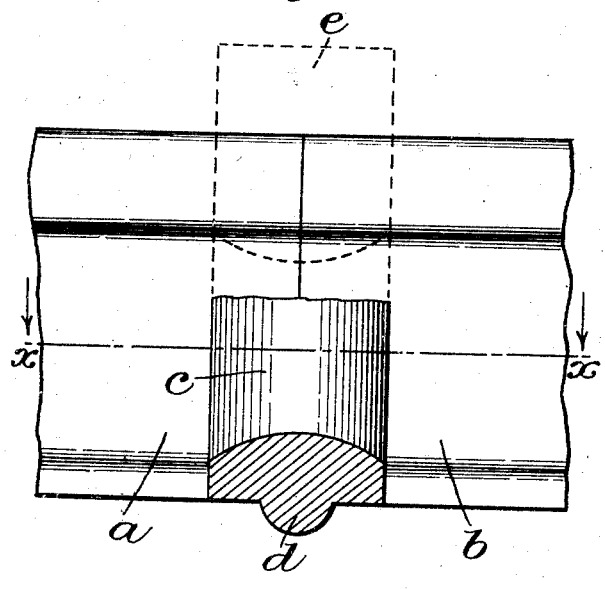
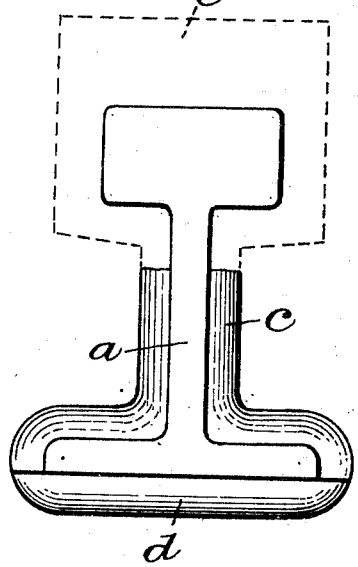
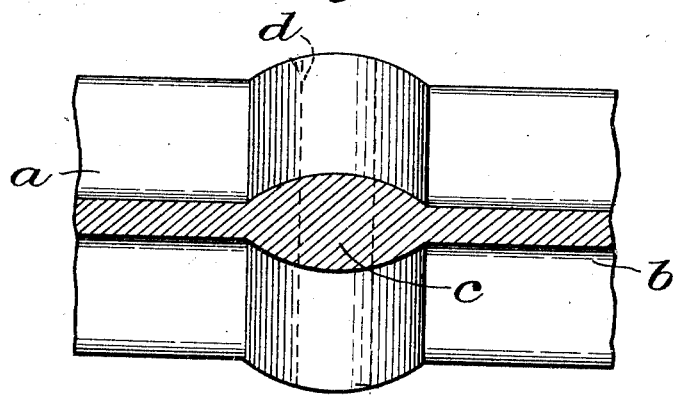
INVENTOR
John Wattmann
HIS ATTORNEY Patented Oct. 22, 1929

1,732,390

UNITED STATES PATENT OFFICE

JOHN WATTMANN, OF BERLIN-LANKWITZ, GERMANY

WELDING COLLAR FOR RAIL JOINTS

Application filed December 10, 1928, Serial No. 325,072, and in Germany January 18, 1928.

The invention relates to certain improvements in the collar cast about the ends of railway rails for effecting the welding together of the rail ends by the alumino-thermic or similar method, and has for its object to form that portion of the collar running transversely of the bottom flanges of the rail ends, of a substantially reduced width, as compared with the width of the welding collar adjacent the web and the top surface of the base flange.

The invention is illustrated in the accompanying drawings, in which;

Fig. 1 is a side elevation of a typical rail joint embodying the invention.

Fig. 2 is a section on line x—x of Fig. 1, and,

Fig. 3 is an end elevation.

When supplementary alumino-thermic welding of railway rails already in place in the track under traffic is found necessary or desirable, and the welded joints rest upon double sleepers separated by narrow spaces, it is found difficult to find room for that portion of the welding collar which lies under the base flanges of the rails within the small space between the sleepers. This condition also exists with the use of metallic ties or sleepers provided with longitudinal channels in their upper surfaces, which are usually narrower than the width of the normal welding collar. If it were attempted to reduce the width of the entire welding collar, the strength and durability of the welded joint would be seriously impaired and, even to reduce the width of that portion of the collar in contact with the rail base flange, would produce uneven temperature conditions between the various parts of the rails engaged by the collar and thus set up dangerous stresses in the joint when the latter cools.

The present invention consists in forming and arranging the welding collar at the rail joint so that said collar has a normal width at the lower portions of the rail, webs and upper surfaces of the bottom flanges, and is reduced in width only at the bottom of the flange to the extent required by the arrangement of the cross-ties or sleepers. The desired object is attained without imposing an uneven heating of the various parts of the rails at or about the joints, because the rail flange receives the necessary degree of heat from the entire width of the normal welding collar which engages the top of the flange, or, if the heating effect of the normal width collar so engaging the upper portion of the flange is not sufficient, the width or volume of this particular portion of the collar may be commensurately increased.

Referring to the drawings, a, b represent the ends of the rails to be welded, c the welding collar, and e the slag collar. The welding collar c, at the point where it abuts the web and the top of the base flange, is of normal width necessary to heat the rail ends to produce the desired fusion weld, but its under portion d is of materially reduced width throughout its area of contact with the bottom of the rail flange or base, as best shown in Fig. 1, so as to permit the reduced portion d to be applied between closely spaced double cross-ties or between the flanges of a channel-shaped metal tie. The slag collar e is the body of superheated slag, produced by the alumino-thermic reaction, which occupies the upper part of the mold in contact with the rail heads and the upper portions of the webs, and its particular function is to heat the rail heads and subjacent web portions to a temperature which will permit the abutting faces thereof to be pressure welded.

While the particular joint is designed to effect welding of the rail ends at the abutting sections of the webs and bases of the rails, it will be understood that the invention is not limited to this particular type of weld, i.e. a combination fusion and pressure weld, but is also applicable to welds in which the entire surface areas of the adjacent rail ends are either fusion or pressure welded.

I claim:—

A cast metal collar for welding rail joints including sections of normal width adjacent the web and top surfaces of the base flange, and a section of substantially reduced width at the bottom of the flange.

In testimony whereof I affix my signature.

JOHN WATTMANN.